(12) United States Patent
Lv et al.

(10) Patent No.: US 11,054,159 B2
(45) Date of Patent: Jul. 6, 2021

(54) FRESH AIR PURIFICATION WINDOW FOR ANTI-HAZE

(71) Applicant: Dalian University of Technology, Liaoning (CN)

(72) Inventors: Yang Lv, Liaoning (CN); Yixiu Dong, Liaoning (CN); Zhimeng Wang, Liaoning (CN); Fan Feng, Liaoning (CN); Minqi Liu, Liaoning (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 16/805,787

(22) Filed: Mar. 1, 2020

(65) Prior Publication Data
US 2020/0292185 A1 Sep. 17, 2020

(30) Foreign Application Priority Data
Mar. 14, 2019 (CN) .......................... 201910194910.0

(51) Int. Cl.
*F24F 7/013* (2006.01)
*F24F 8/10* (2021.01)
*F24F 8/99* (2021.01)

(52) U.S. Cl.
CPC ................ *F24F 7/013* (2013.01); *F24F 8/10* (2021.01); *F24F 8/99* (2021.01)

(58) Field of Classification Search
CPC ...... F24F 7/013; F24F 8/10; F24F 8/99; F24F 8/117; F24F 8/108; F24F 13/18; F24F 3/14; F24F 13/28; Y02A 50/20; E06B 3/66; E06B 7/02; E06B 7/08; E06B 7/04; E06B 2007/026; E06B 2007/023; E05F 15/07
USPC .......................... 454/190, 198, 200, 207, 202
See application file for complete search history.

(56) References Cited

U.S. PATENT DOCUMENTS

| 7,270,600 | B2* | 9/2007 | Kim ....................... F24F 12/006 454/198 |
| 9,739,500 | B2* | 8/2017 | Wang ......................... F24F 8/10 |
| 2004/0253917 | A1* | 12/2004 | Kim ....................... F24F 12/006 454/200 |
| 2019/0118128 | A1* | 4/2019 | Ji ........................ B01D 46/448 |

* cited by examiner

*Primary Examiner* — Jessica Yuen (57) ABSTRACT

The application provides a fresh air purification window for preventing haze. A ventilation device is provided with an upper layer and a lower layer and partitioned by a transverse middle-layer partition plate, an exhaust fan is mounted in the upper layer, an air feeder is mounted in the lower layer, an air inlet grille is formed on the upper layer through front-layer glass, and a half-closed space with an air cavity unidirectionally provided with an exhaust opening is formed by the upper layer, upper-layer glass, a middle-layer separation partition plate and air cavity one-sided glass. The fresh air purification window has the effects of lowering the shielding light ray of the current purification window and enabling the current purification window to be compact in structure.

5 Claims, 9 Drawing Sheets

FIG.12

FRESH AIR PURIFICATION WINDOW FOR ANTI-HAZE

CROSS REFERENCE TO RELATED APPLICATIONS

The present application claims the priority of the Chinese Patent Application with the Application No. 201910194910.0 filed on Mar. 14, 2019, which is incorporated herein in the entire by reference.

TECHNICAL FIELD

The application relates to a field of fresh air purification, and generally relates to a fresh air purification window for anti-haze.

BACKGROUND

In recent years, an outdoor haze has become a more and more serious problem. Direct opening of windows for ventilation will introduce $PM_{2.5}$ from outdoor into indoor, thus polluting the indoor air, impairing human health, and thus, extremely easily causing respiratory diseases, chronic lung diseases, trachitis, bronchitis and lung cancer and the like. However, due to physiological needs of the human body, it is necessary to open the window for ventilation and thus to accept the fresh air. An air purification window capable of purifying pollutants and for ventilation has emerged. There are many varieties of fresh air purification products on the current market. This disclosure performs in-depth analysis on products having a same type or a same function.

The first one is an air purifier whose main function is to remove indoor $PM_{2.5}$ and allergens. Depending on different brands and functions of the air purifier, a price of the air purifier is about a few hundred to a few thousand CNY, which is suitable for families with different needs. However, it is necessary to keep the air purifier continuously on during purification, and the air purifier cannot be automatically converted to be on/off according to a concentration of the indoor PM2.5. Meanwhile, depending on different placement positions for the air purifier, the air purifier usually has an purifying effect for a part of an area in a room, and it is difficult to benefit the whole room.

The second one is an electrostatic dust removal and purification window whose working principle is to provide a high-voltage electrostatic device between casements. Particulate pollutants in the air are removed by means of high-pressure static electricity, and the electrostatic dust removal and purification window has a simple and effective structure. However, switches of the high-voltage electrostatic device still need for manual control, and the high-voltage electrostatic device has no automatic on-off function, and thus, a long-time operation for the high-voltage electrostatic device will inevitably consume a large amount of electric energy and thus waste resources.

In addition, the third one is a purification window in which filter screens are installed. The large-area filter screens cover the window, which affects a most basic light transmission function of the window, and discomforts the human in the room.

The last one is an air humidifier which can only be used for local humidification and which may cause walls to spoil due to improper placement for the air humidifier. Indoor air humidifiers need to be continuously filled with water to maintain the humidification function, which will produce molds to pollute the air.

SUMMARY

The present disclosure provides the following technical solution, to solve the problem of reducing a shielding space of the current purification window and causing the its structure to be compact: a fresh air purification window for anti-haze, including a space formed by a front layer of glass and a rear layer of glass, wherein the front layer of glass is indoor glass, and the rear layer of glass is outdoor glass. An air cavity is formed between the two layers of glass. An air exchange device with glass and openings is formed near a center of the air cavity. The air exchange device includes upper and lower layers separated by a horizontal middle partition plate; an air exhaust fan is installed in the upper layer, and an air supply fan is installed in the lower layer. In the upper layer, the front layer of glass forms an air intake grille, and a semi-closed space of the air cavity having a one-way air outlet is formed with the upper layer glass, the middle layer partition plate, and one side glass of the air cavity; In the lower layer, the rear layer of glass forms an air intake grille, and a semi-closed space of the air cavity having a one-way air inlet is formed with the lower layer glass, the middle layer partition plate, and one side glass of the air cavity; wherein the one side glass of the air cavity is installed at the left or the right side, and the one side glass of the air cavity in the upper layer and the one side glass of the air cavity in the lower layer are installed in a left-right direction; and the air outlet in the upper layer and the air inlet in the lower layer are installed in a left-right direction; at outdoor side of the rear layer of glass in the lower layer, a spray nozzle is installed at the glass near the top of the middle partition plate. An inner layer of the air intake grille of the rear layer of glass in the lower layer is installed with a filter screen; for the front and the rear layers of glass at a side opposite to the air inlet in the lower layer (for the opposite side, for example, if the air inlet is toward left of the air cavity, the opposite side is the left space of the air cavity), the rear layer of glass is installed with an outer shutter in an air supply cavity by a rotating shaft for an outer shutter in an air supply cavity, and the front layer of glass is installed with an inner shutter in the air supply cavity by a rotating shaft for an inner shutter in the air supply cavity; for the front and the rear layers of glass at a side opposite to the air outlet in the upper layer, the rear layer of glass is installed with an outer shutter in an air exhaust cavity by a rotating shaft for an outer shutter in an air exhaust cavity, and the front layer of glass is installed with an inner shutter in the air exhaust cavity by a rotating shaft for an inner shutter in the air exhaust cavity; the connection by the rotating shaft for the shutter is provided such that the respective shutter is open to connect to the indoor or outdoor space.

Further, each of above shutters is installed at corresponding end of glass and each of above rotating shafts is installed at corresponding window frame, such that the corresponding glass and window frame are connected via corresponding shutter, the window frames are installed at walls.

Further, a hinge shaft of each shutter for air exhaust and air supply is connected to a stepping motor. A PM2.5 sensor for monitoring a concentration of the pollutant and the solar panel for supplying the electric energy are disposed outside the fresh air purification window for anti-haze. The stepping motor and the PM2.5 sensor are connected to a control system.

Further, the spray nozzle is a high pressure spray nozzle that is connected to an indoor water supply pipe.

Further, the fresh air purification window for anti-haze further includes a cloud server, an APP, and a WIFI module.

The PM2.5 sensor transmits collected data to the APP through the cloud server, and signals in the corresponding mode selected by the user according to the data are transmitted to the cloud server through the APP, and the cloud server transmits control signals for starting motors to the motors through the WiFi module, the control signals is used for controlling the controlled starting or closing of the motors of four shutters and two fans.

The beneficial effect are that: compared with a purification window that blocks up a screen window only with a filter paper, a main body of the fresh air purification window for anti-haze according to the present disclosure is still transparent glass, and the ventilation and purification working modules such as fans and filter screens only occupy a small part of the volume, which does not affect the lighting function. Compared with the air purifier which can only be applied to some areas, the fresh air purification window for anti-haze according to the present disclosure purifies the air at the source, so that the indoors are protected from contaminants. Compared with the electrostatic dust removal and purification window which keeps operating and thus consumes power and needs manual control, the fresh air purification window for anti-haze according to the present disclosure has a sensor-based control system, which can work intermittently according to the concentration of outdoor pollutants, thereby saving energy. An intelligent WiFi module is provided to remotely control the operation and opening and closing of the window through the mobile APP. Compared with the electrostatic dust removal and purification window in which only the purification is considered, the fresh air purification window for anti-haze according to the present disclosure is still provided with a natural mode and has a common out-opening window. For the common out-opening window, when the user has a power failure, a manual opening form can still be selected to prevent indoors from not ventilating. It can be naturally ventilated when the air quality reach a standard, which respects people's traditional ventilation habits and saves energy. Compared with the air humidifier which can only humidify locally and thus easily cause walls to spoil, and which needs to be continuously filled with water and thus produces molds, the spray device of the fresh air purification window for anti-haze according to the present disclosure combines functions of the humidification and the impurity sedimentation, and the humid air is introduced into the room by the fans, the pressure is larger, the propagation range is wider, and the local humidification of the humidifier is also avoided. In addition, the fresh air purification window for anti-haze according to the present disclosure is connected to the indoor water supply pipe, which can directly introduce water, without artificially adding, which is convenient for users, and keep the water quality fresh.

1*a*. a rotating shaft for an outer shutter in an air supply cavity; 1*b*. a rotating shaft for an inner shutter in the air supply cavity; 1*c*. a rotating shaft for an outer shutter in an air exhaust cavity; 1*d*. a rotating shaft for an inner shutter in the air exhaust cavity; 2*a*. the outer shutter in the air supply cavity; 2*b*. the inner shutter in the air supply cavity; 2*c*. the outer shutter in the air exhaust cavity; 2*d*. the inner shutter in the air exhaust cavity; 3*a*. an inlet of the air supply cavity; 3*b*. an inlet of the air exhaust cavity; 4*a*. an air supply fan; 4*b*. an air exhaust fan; 5*a*. the air supply cavity; 5*b*. the air exhaust cavity; 6*a*. an upper window frame; 6*b*. a lower window frame; 6*c*. a left window frame; 6*d*. a right window frame; 7*a*. a baffle of the air supply cavity; 7*b*. a baffle of the air exhaust cavity; 8*a*. an old air inlet, 8*b* a fresh air inlet; 9. a middle partition plate; 10. filter screens; 11. Glass casements for the natural ventilation; 12. Solar panels; 13. A high pressure nozzle, 14. Glass casements for the purification ventilation.

DETAIL DESCRIPTION OF EMBODIMENTS

Figure 1:
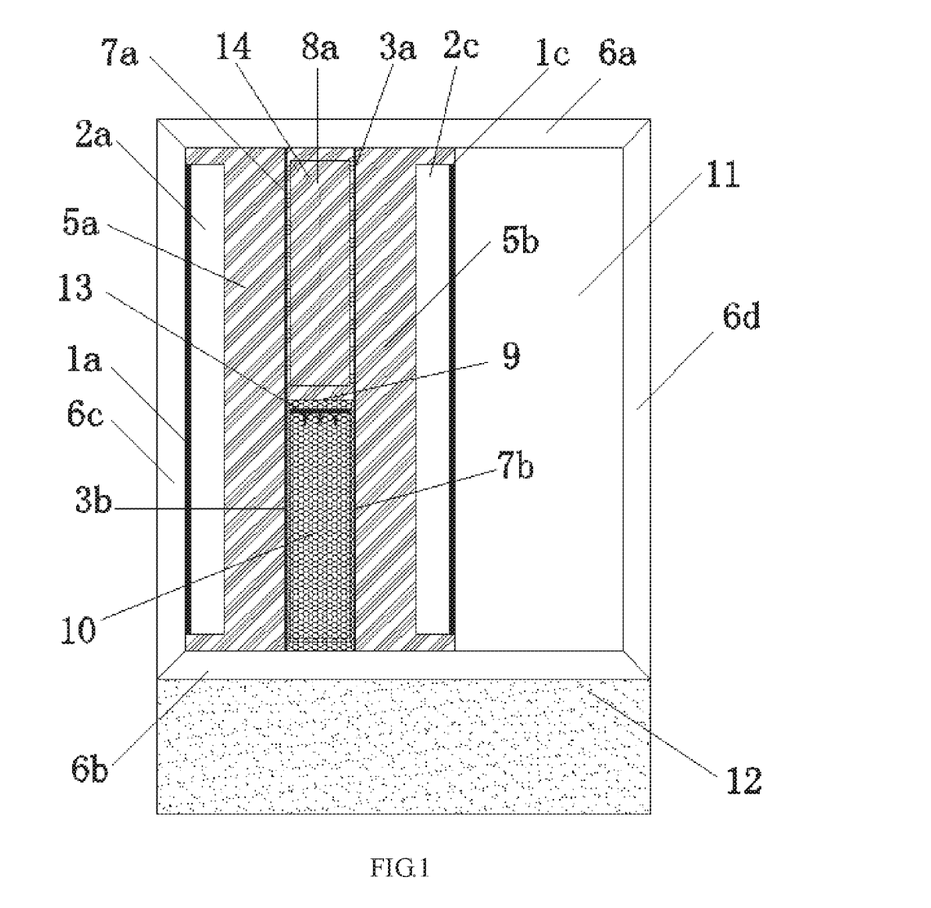
FIG. 1 is a front view of a fresh air purification window for anti-haze (viewing indoors from outdoor)
Figure 2:
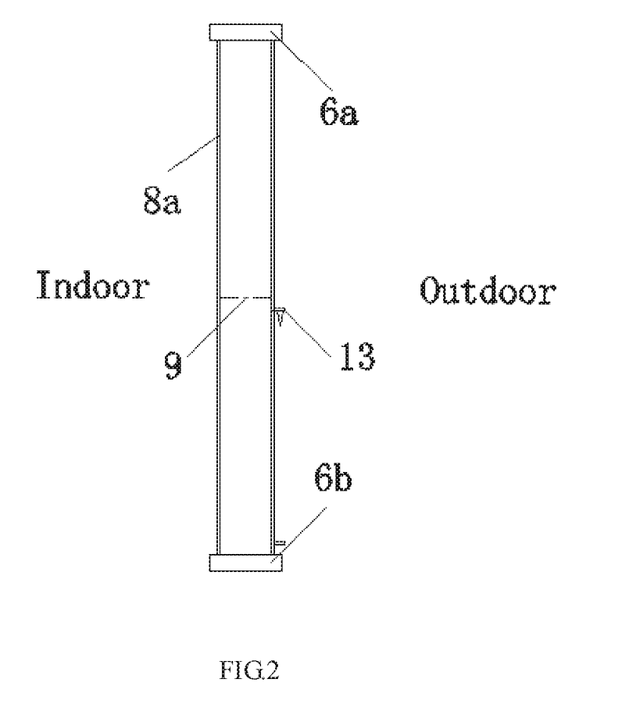
FIG. 2 is a side view of the fresh air purification window for anti-haze.
Figure 3:
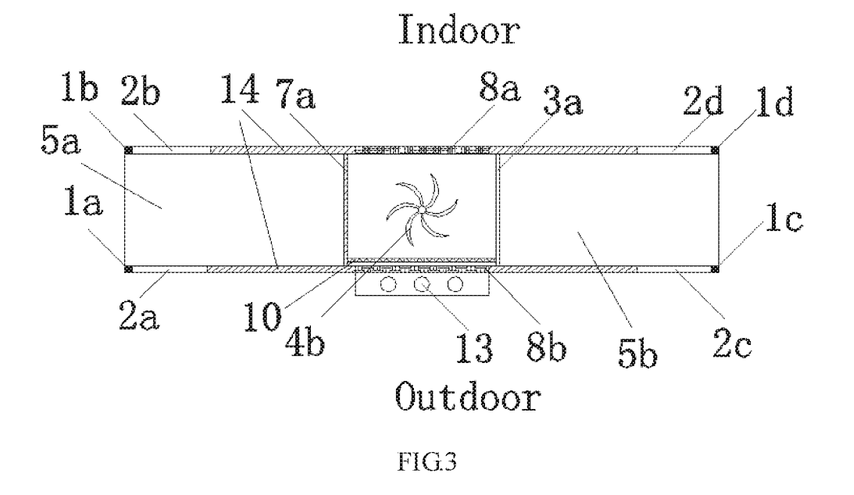
FIG. 3 is a plan view of the fresh air purification window for anti-haze.
Figure 4:
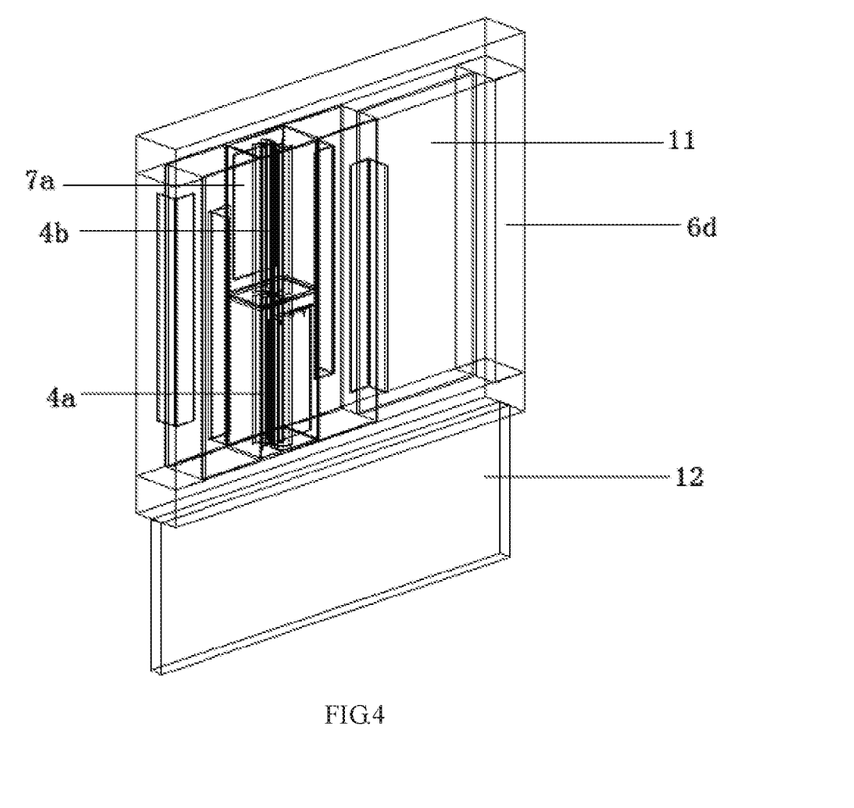
FIG. 4 is an oblique 45° three-dimensional view of the fresh air purification window for anti-haze.
Figure 5:
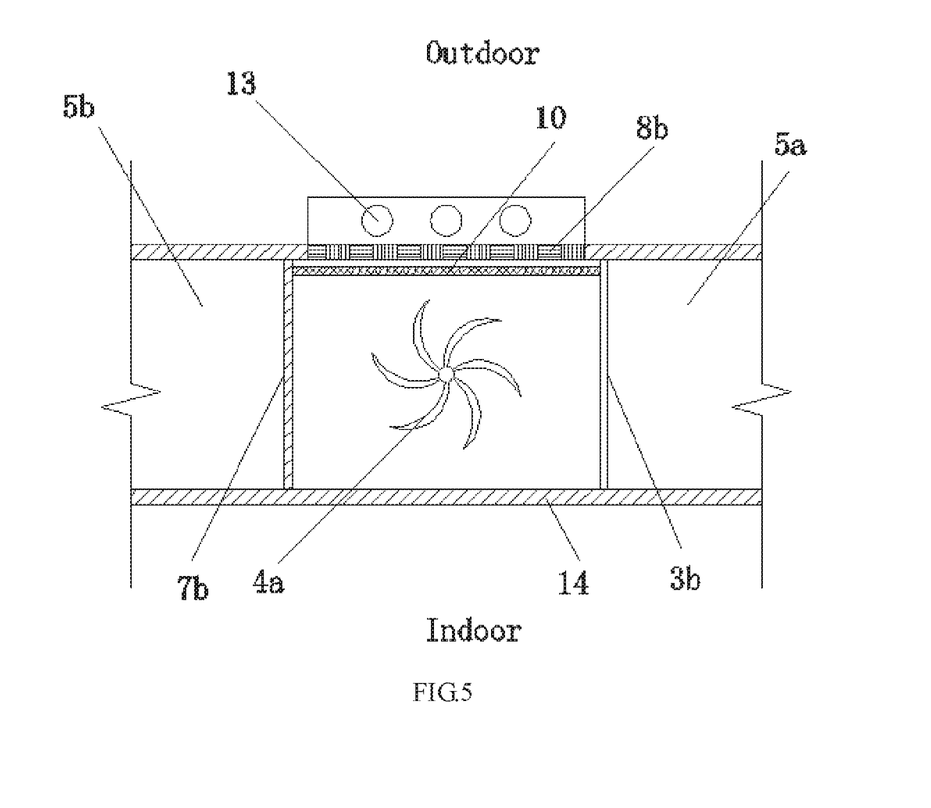
FIG. 5 is a detailed bottom view of a fan.
Figure 6:
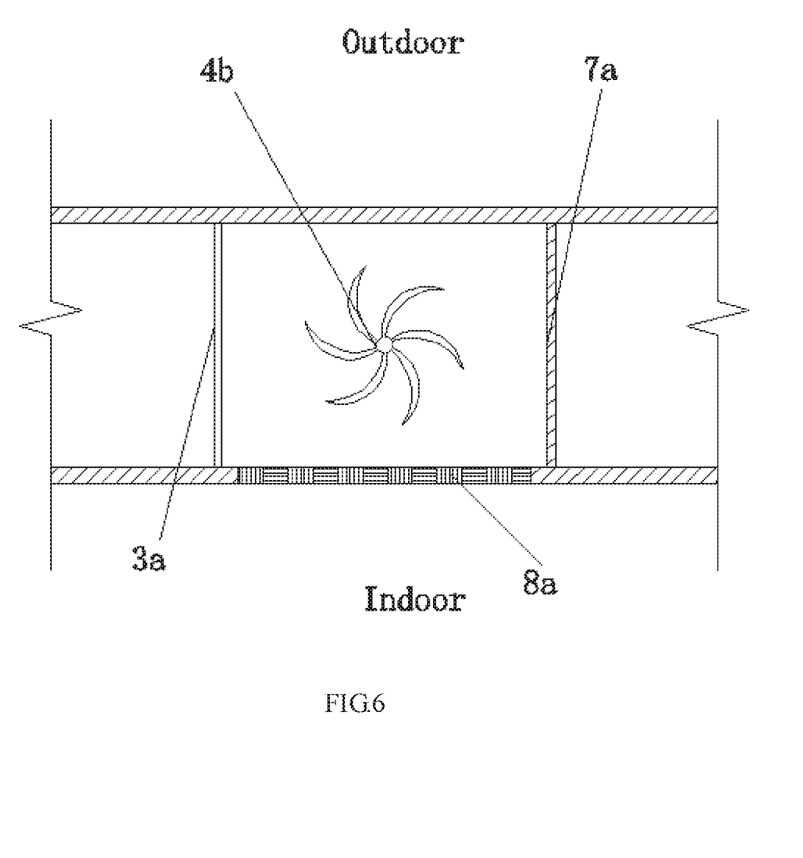
FIG. 6 is a detailed plan view of a fan.
Figure 7:
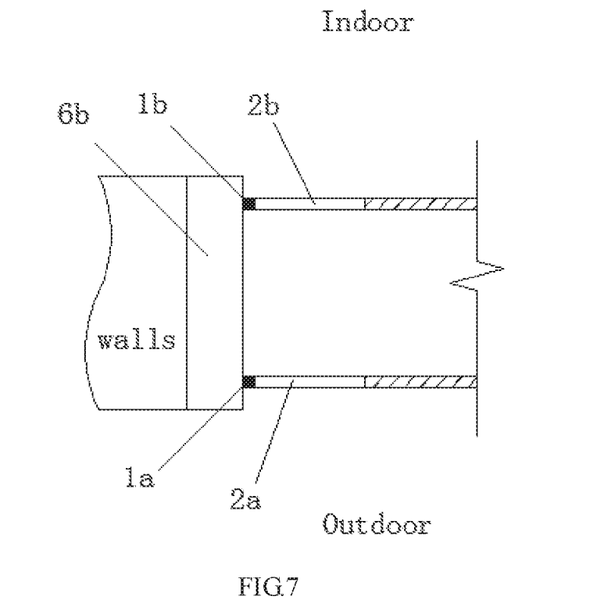
FIG. 7 is a detailed view of a connection form for a shutter.
Figure 8:
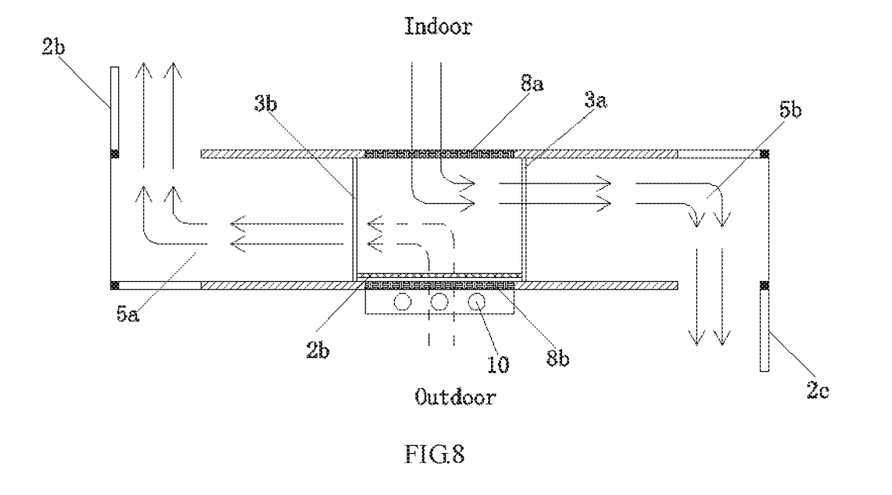
FIG. 8 is a schematic diagram of the ventilation in a filtration mode.

Embodiment 1: A fresh air purification window for anti-haze, as shown in Figures. 2 and 4, including a space formed by a front layer of glass and a rear layer of glass, wherein the front layer of glass is indoor glass, and the rear layer of glass is outdoor glass. An air cavity is formed between the two layers of glass, as shown in FIG. 8. An air exchange device with glass and openings is formed near a center of the air cavity, as shown in FIG. 4. The air exchange device includes upper and lower layers separated by a horizontal middle partition plate; an air exhaust fan is installed in the upper layer, and an air supply fan is installed in the lower layer. In the upper layer, the front layer of glass forms an air intake grille, and a semi-closed space of the air cavity having a one-way air outlet is formed with the upper layer glass, the middle layer partition plate, and one side glass of the air cavity; In the lower layer, the rear layer of glass forms an air intake grille, and a semi-closed space of the air cavity having a one-way air inlet is formed with the lower layer glass, the middle layer partition plate, and one side glass of the air cavity; wherein the one side glass of the air cavity is installed at the left or the right side, and the one side glass of the air cavity in the upper layer and the one side glass of the air cavity in the lower layer are installed in a left-right direction; and the air outlet in the upper layer and the air inlet in the lower layer are installed in a left-right direction; at outdoor side of the rear layer of glass in the lower layer, a spray nozzle is installed at the glass near the top of the middle partition plate. Thus, it can be seen that for the upper and lower layered structure, the lower layer is selected as the fresh air layer because the fresh air requires a high pressure spray nozzle spraying, the height of the nozzle is lowered such that a range of impact of the spraying can be reduced, but the range must include a range of all the fresh air. Therefore, the lower layer is the fresh air layer, such that the high pressure spray nozzle can be installed at a lower position, and all fresh air can be sprayed under the range of impact of the spraying. An inner layer of the air intake grille of the rear layer of glass in the lower layer is installed with a filter screen; for the front and the rear layers of glass at a side opposite to the air inlet in the lower layer, the rear layer of glass is installed with an outer shutter in an air supply cavity by a rotating shaft for an outer shutter in an air supply cavity, and the front layer of glass is installed with an inner shutter in the air supply cavity by a rotating shaft for an inner shutter in the air supply cavity; for the front and the rear layers of glass at a side opposite to the air outlet in the upper layer, the rear layer of glass is installed with an outer shutter in an air exhaust cavity by a rotating shaft for an outer shutter in an air exhaust cavity, and the front layer of glass is installed with an inner shutter in the air exhaust cavity by a rotating shaft for an inner shutter in the air exhaust cavity; the connection by the rotating shaft for the shutter is provided such that the respective shutter is open to connect to the indoor or outdoor space. Thus, it can be seen that the air exchange device is provided as including upper and lower layers opposite to an opening of the air cavity, which can achieve a high degree of integration for the air exchange, such that in the purification window which is necessarily a compact and highly integrated product, the beneficial effect of small shielding, small size, high transparency, etc can be achieved.

It can be known from the above solution that in the central portion of the air cavity, the upper and lower layers are formed to form two one-way air openings at left and right air cavities opposite to each other, so that in the air cavity, one air exchange device is provided such that an entrance and a discharge of old air and fresh air can be synchronously performed in one air cavity (between two layers of glass), without addition of the number of layers of glass to design different air paths for the air supply and the air exhaust, such that the requirement where a thickness of glass and shelters should be reduced as much as possible has been satisfied, and the use of components is reduced as much as possible, thereby achieving a compact space.

For the front and the rear layers of glass at a side opposite to the air inlet in the lower layer, the rear layer of glass is installed with an outer shutter in an air supply cavity by a rotating shaft for an outer shutter in an air supply cavity, and the front layer of glass is installed with an inner shutter in the air supply cavity by a rotating shaft for an inner shutter in the air supply cavity; for the front and the rear layers of glass at a side opposite to the air outlet in the upper layer, the rear layer of glass is installed with an outer shutter in an air exhaust cavity by a rotating shaft for an outer shutter in an air exhaust cavity, and the front layer of glass is installed with an inner shutter in the air exhaust cavity by a rotating shaft for an inner shutter in the air exhaust cavity; the connection by the rotating shaft for the shutter is provided such that the respective shutter is open to connect to the indoor or outdoor space.

Each of above shutters is installed at corresponding end of glass and each of above rotating shafts is installed between corresponding glass and window frame, such that the corresponding glass and window frame are connected via corresponding shutter. A hinge shaft of each shutter for air exhaust and air supply is connected to a stepping motor. A PM2.5 sensor for monitoring a concentration of the pollutant and the solar panel for supplying the electric energy are disposed outside the fresh air purification window for anti-haze. The stepping motor and the PM2.5 sensor are connected to a control system.

The spray nozzle is a high pressure spray nozzle that is connected to an indoor water supply pipe. A cloud server, an APP, and a WIFI module are included. The PM2.5 sensor transmits collected data to the APP through the cloud server, and signals in the corresponding mode selected by the user according to the data are transmitted to the cloud server through the APP, and the cloud server transmits control signals for starting motors to the motors through the WiFi module, the control signals is used for controlling the controlled starting or closing of the motors of four shutters and two fans.

Embodiment 2: The present application will be further described below with reference to the accompanying drawings:

FIGS. 1, 2, 3, 4, 5, 6, and 7 are structural views of the fresh air purification window for anti-haze.

The fresh air purification window for anti-haze includes two units, that is, a natural ventilation unit and a purification and ventilation unit, respectively. The natural ventilation unit is a common in-opening window including casements and window frames. The purification and ventilation unit is the core of the fresh air purification window for anti-haze including casements and two layers of glass, and further including two L-shaped structures which forms a square shape by oppositely arranging together. The two L-shaped structures are an air supply unit and an air exhaust unit, respectively, which are separated from each other by a baffle of the air supply cavity 7a, a baffle of the air exhaust cavity 7b and a middle partition plate 9. The air supply unit is mainly composed of two layers of glass, between which an air supply fan 4a is sandwiched. An outer shutter in the air supply cavity 2a and an inlet of the air supply cavity 3a are provided at the glass. A high pressure spray nozzle 13 is arranged on the upper part of the inlet of the air supply cavity 3a, and filter screens 10 are arranged at the inlet of the air supply cavity 3a. The outer shutters in the air supply cavity 2a are connected to the window frames through outer hinges. The inner shutter in the air supply cavity 2b is provided at the junction of the window frame and the glass. The inner shutters in the air supply cavity 2b are connected to the window frames through inner hinges. The air exhaust unit is mainly composed of two layers of glass, between which an air exhaust fan 4b is sandwiched. An outer shutter in the air exhaust cavity 2c is provided at the junction of the window frame and the glass. The outer shutters in the air exhaust cavity 2c are connected to the window frames through outer hinges. An inner shutter in the air exhaust cavity 2d and an inlet of the air exhaust cavity 3b are provided at inner glass. The inner shutters in the air exhaust cavity 2d are connected to the window frames through inner hinges.

Under different outdoor air quality conditions, the above products create an indoor environment with being always clean fresh air for the user, and also retain the basic functions of light transmission and natural ventilation for windows. The purification window according to the present disclosure can humidify the introduced air through the high pressure spray nozzle to provide a more comfortable experience for people. The automatic control and APP are provided to make windows smart and are easy for people to use. The purification window is equipped with a solar panel, which can provide supplementary power and save energy.

The fresh air purification window for anti-haze according to the present disclosure includes window frames and glass, and further includes a combination of one natural ventilation unit and one purification ventilation unit. The natural ventilation unit is a common in-opening window, including casements and window frames. The purification and ventilation unit is a structure for two L-shaped structures which forms a square shape by oppositely arranging together, including window frames, an inner layer of glass and an outer layer of glass. One of the two L-shaped structures is the air supply unit, and the other is the air exhaust unit. The high pressure spray nozzle is installed in front of the air supply inlet to carry out sedimentation and dust removal, and preliminary purification and humidification. In the fresh air purification window for anti-haze mode, the controller receives a concentration signal from the sensor, and automatically adjusts to different opening modes according to the concentration of PM2.5: when the concentration of the outdoor PM2.5 exceeds a standard, the filtration mode is used. When the concentration of the outdoor PM2.5 does not exceed the standard, the natural mode is used. For the WiFi module of the fresh air purification window for anti-haze, the window can be remotely controlled through the WiFi module.

a) APP Manual Mode

The APP collects the sensor detection data transmitted from the cloud server and provides the data to the user. After receiving a feedback, the user controls the APP on the mobile terminal, and the APP sends the instruction to the cloud server, and the cloud server transmits the instruction to the controller to control different modes of the window.

b) APP Automatic Mode

The sensor transmits the signal directly to the controller through the cloud server, and the controller directly controls the opening or closing of the stepping motor corresponding to each shutter and each fan.

The solar panels of the fresh air purification window for anti-haze to convert solar energy into electrical energy for providing supplementary power to components of the entire purification window, such as PM2.5 sensors, stepper motors, air supply fans, air exhaust fans, high pressure spray nozzles, controllers, the WiFi module.

In the above structure, the air treatment path is shorter; the filter screens can be placed at the air supply inlet to help protect the internal components from dust pollution; hinges (rotating shafts) for the air supply outlet and the air exhaust outlet are longitudinal, which can more reduce the load when the stepping motor is controlled to open and close compared to horizontal hinges (rotating shafts). The air treatment unit is concentrated in the middle of the window. The left-middle-right structure makes the air supply mode close to a flat-opening window, the air openings are larger, the air supply is uniform, and the number of glass is reduced, so the fans can be coaxial and be operated by use of one motor.

A $PM_{2.5}$ sensor is installed outside the windows. Solar panels 12 are installed under the windows.

FIG. 8 is a schematic view showing the ventilation of the fresh air purification window for anti-haze in the filtration mode. When the concentration of the outdoor $PM_{2.5}$ exceeds the standard, the outer shutter in the air supply cavity 2a, the inner shutter in the air exhaust cavity 2d are closed, the inner shutter in the air supply cavity 2b, the outer shutter in the air exhaust cavity 2c are opened, and the air supply fan 4a, the air exhaust fan 4b are turned on, and the high pressure spray nozzle 13 is turned on. The outdoor fresh air is sent to the air supply cavity 5a by the air supply fan 4a through filter screens 10, and is sent into the room through the inner shutter in the air supply cavity 2b. The indoor old air is sent to the air exhaust cavity 5b by the air exhaust fan 4b through the inlet of the air exhaust cavity 3b, and is discharged to outdoor through the outer shutter in the air exhaust cavity 2c.

Figure 9:
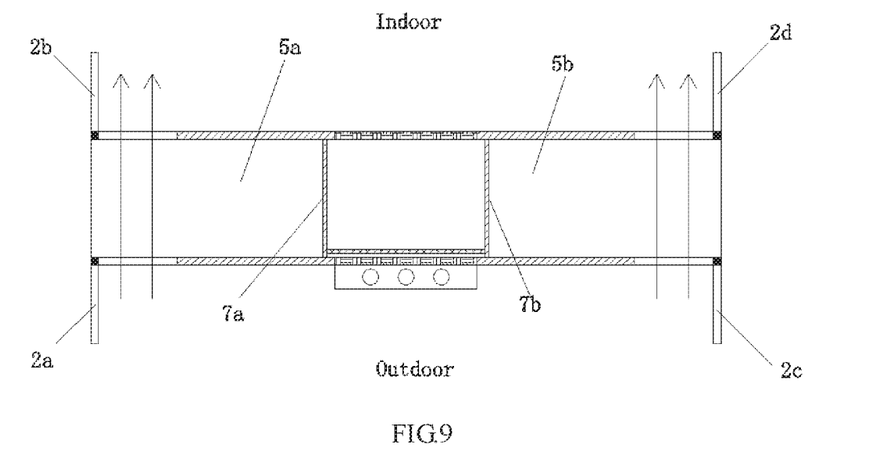
FIG. 9 is a schematic diagram of the ventilation in a natural mode.

FIG. 9 is a schematic view showing the ventilation of the fresh air purification window for anti-haze in the natural mode. When the concentration of the outdoor $PM_{2.5}$ does not exceed the standard, the outer shutter in the air supply cavity 2a, the inner shutter in the air supply cavity 2b, the outer shutter in the air exhaust cavity 2c and the inner shutter in the air exhaust cavity 2d are opened, the air supply fan 4a, an air exhaust fan 4b are turned off. The outdoor fresh air and the indoor old air directly penetrate the outer shutter in the air supply cavity 2a, the inner shutter in the air supply cavity 2b, the outer shutter in the air exhaust cavity 2c and the inner shutter in the air exhaust cavity 2d into the room or outdoor. Glass casements that can be manually opened is used as a natural ventilation unit to prevent the window hinge from opening when the power is off, and the ventilation function cannot be achieved.

Figure 10:
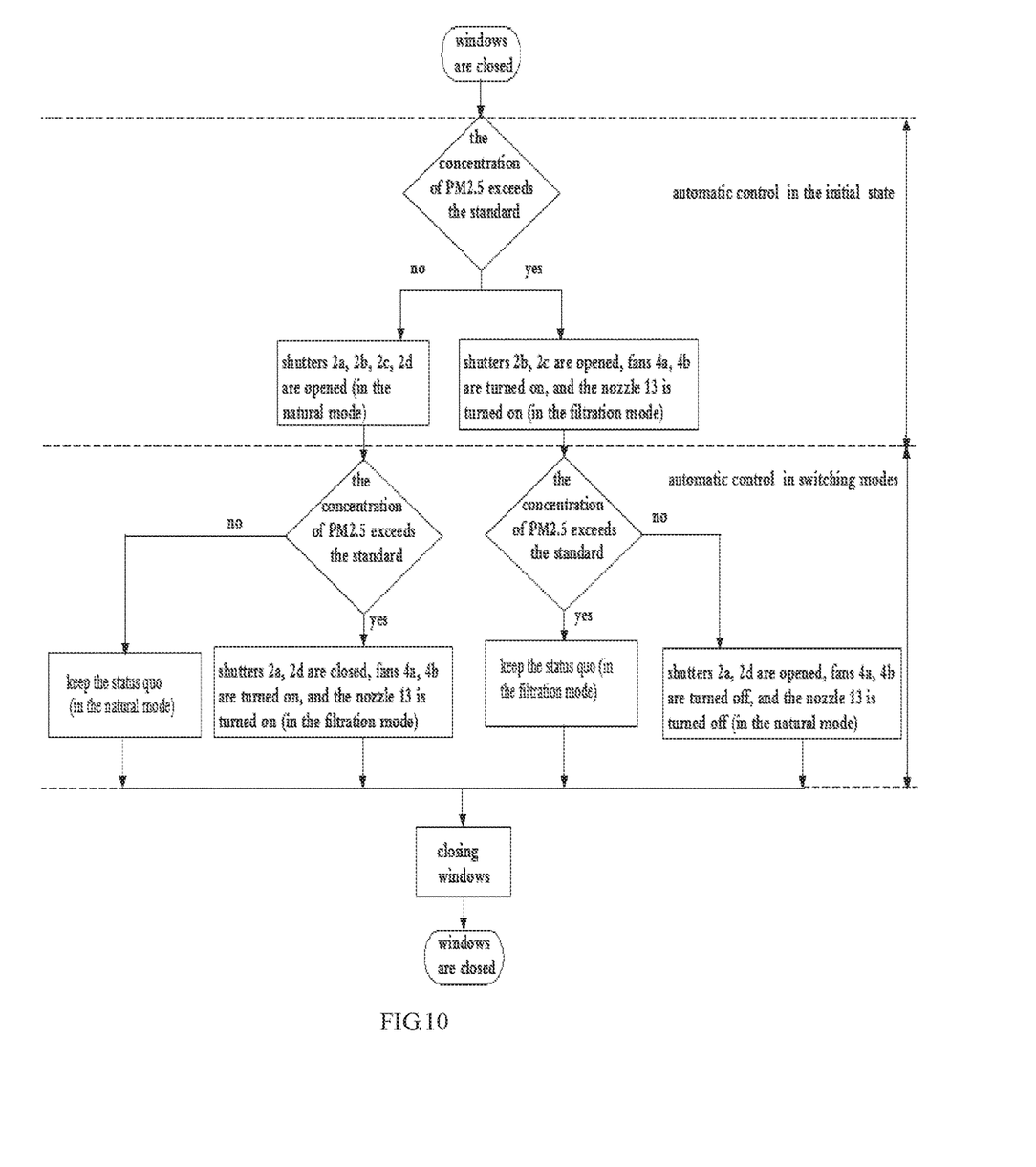
FIG. 10 is a flow chart of an automatic control for the fresh air purification window for anti-haze.

FIG. 10 is a flow chart showing the automatic control for the fresh air purification window for anti-haze. The automatic control logic in the initial state of the window to be opened is described as follows: The sensor detects whether the concentration of $PM_{2.5}$ exceeds the standard, and if so, the filtering mode is turned on. At the same time, the air supply and the air exhaust operation are performed, and the inner shutter in the air supply cavity 2b, the outer shutter in the air exhaust cavity 2c are opened, the air supply fan 4a, an air exhaust fan 4b are turned on and the high pressure spray nozzle 13 is turned on. For the air supply, the outdoor fresh air is sucked into the lower layer by the air supply fan 4a, and the high pressure spray nozzle 13 sprays water for filtering; the fresh air is filtered by the filter screens and then enter the lower space, to the air supply cavity by the air supply fan 4a through the air supply inlet, and arrives indoor via the inner shutter in the air supply cavity 2b. For the air exhaust, the indoor old air is sucked into the upper space by the air exhaust fan 4b, and then to the air exhaust cavity by the air exhaust fan 4b through the air exhaust inlet and arrives outdoor via the outer shutter in the air exhaust cavity 2c. If the concentration of $PM_{2.5}$ does not exceed the standard, the outer shutter in the air supply cavity 2a, the inner shutter in the air supply cavity 2b, the outer shutter in the air exhaust cavity 2c and the inner shutter in the air exhaust cavity 2d are opened, entering the natural mode.

In the natural mode, the automatic control logic for switching modes when the outdoor pollutant parameters change is described below. In the natural mode, if the concentration of $PM_{2.5}$ exceeds the standard, the outer shutter in the air supply cavity 2a, the inner shutter in the air exhaust cavity 2d are closed, the air supply fan 4a, an air exhaust fan 4b are turned on, and the high pressure spray nozzle 13 is turned on, entering the filtration mode, otherwise keep the status quo. In the filtration mode, if the concentration of $PM_{2.5}$ does not exceed the standard, the air supply fan 4a, the air exhaust fan 4b are turned off. and the high pressure spray nozzle 13 is turned off, and the outer shutter in the air supply cavity 2a, the inner shutter in the air exhaust cavity 2d are open, entering the natural mode, otherwise keep the status quo.

Figure 11:
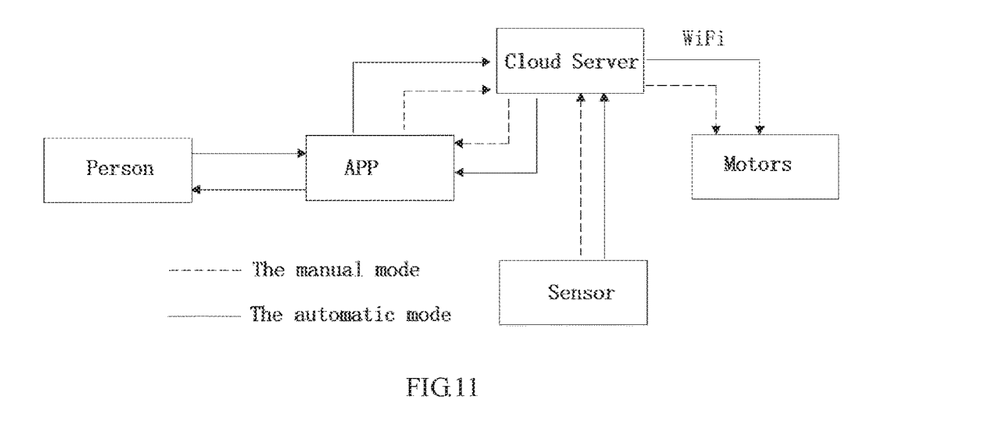
FIG. 11 is a schematic diagram of an APP control for the fresh air purification window for anti-haze.

FIG. 11 shows a schematic diagram of APP control. In the manual mode, the sensor transmits the collected data to the APP through the cloud server, and the APP feeds the signal back to the person. The person selects modes according to the signals, transmits the instruction to the cloud server through the WiFi module, and the cloud server transmits the instruction to the motor through the WiFi module. The motor that controls the four shutters and the two fans are started under the control.

Figure 12:
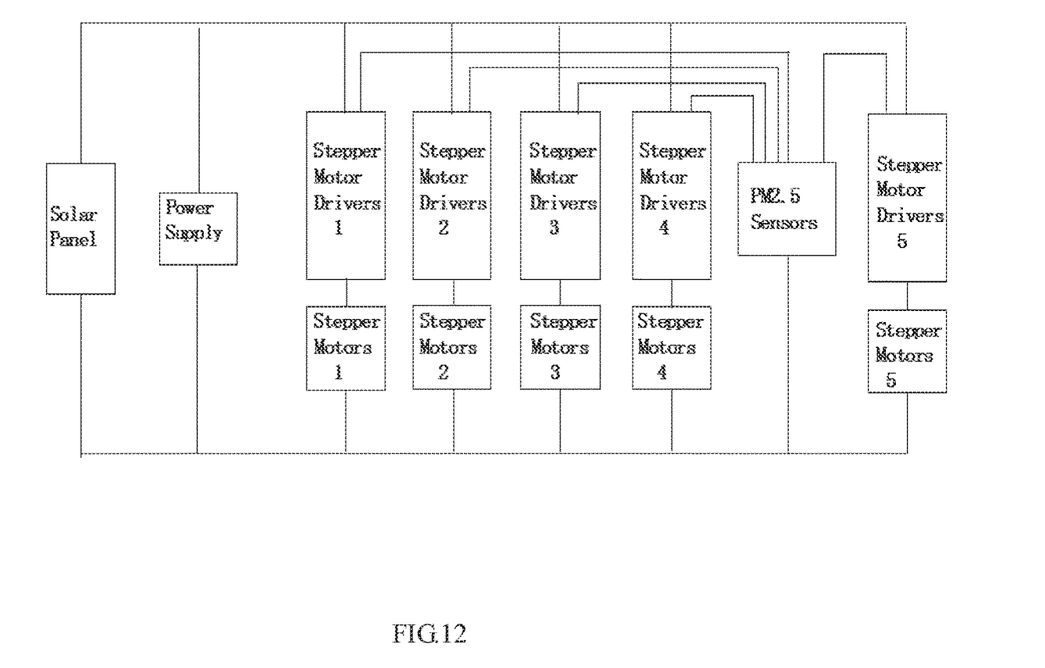
FIG. 12 is a circuit diagram for the fresh air purification window for anti-haze.

FIG. 12 is a circuit diagram of the fresh air purification window for anti-haze. Turning on or off two power supply systems (a power supply and the solar panel) provides power to PM$_{2.5}$ sensors, stepper motor drivers and stepper motors, direct current motor drivers and direct current stepper motors. Comparing PM$_{2.5}$ sensor displays with the standard value, different instructions are output, which are transmitted to each stepper motor driver to control each stepper motor, forming the filtration mode and the natural mode. The stepper motor 1 controls the outer shutter in the air supply cavity, the stepper motor 2 controls the inner shutter in the air supply cavity, the stepper motor 3 controls the outer shutter in the air exhaust cavity, the stepper motor 4 controls the inner shutter in the air exhaust cavity, and the direct current motor 5 controls the air supply fan and the air exhaust fan.

The above description is only for the purpose of creating a preferred embodiment of the present application, but the scope of protection created by the present application is not limited thereto, and any person skilled in the art can make various modifications and variants to the technical solution and the inventive concept of this disclosure without departing from spirit and scope of this disclosure. Equivalent substitutions or changes to the technical solutions and their inventive concepts are intended to be included within the scope of the application.

What is claimed is:

1. A fresh air purification window for anti-haze, comprising a space formed by a front layer of glass and a rear layer of glass, wherein the front layer of glass is indoor glass, and the rear layer of glass is outdoor glass; an air cavity is formed between the two layers of glass; an air exchange device with glass and openings is formed near a center of the air cavity; the air exchange device includes upper and lower layers separated by a horizontal middle partition plate; an air exhaust fan is installed in the upper layer, and an air supply fan is installed in the lower layer; in the upper layer, the front layer of glass forms an air intake grille, and a semi-closed space of the air cavity having a one-way air outlet is formed with the upper layer glass, the middle layer partition plate, and one side glass of the air cavity; in the lower layer, the rear layer of glass forms an air intake grille, and a semi-closed space of the air cavity having a one-way air inlet is formed with the lower layer glass, the middle layer partition plate, and one side glass of the air cavity; wherein the one side glass of the air cavity is installed at the left or the right side, and the one side glass of the air cavity in the upper layer and the one side glass of the air cavity in the lower layer are installed in a left-right direction; and the air outlet in the upper layer and the air inlet in the lower layer are installed in a left-right direction; at outdoor side of the rear layer of glass in the lower layer, a spray nozzle is installed at the glass near the top of the middle partition plate; an inner layer of the air intake grille of the rear layer of glass in the lower layer is installed with a filter screen; for the front and the rear layers of glass at a side opposite to the air inlet in the lower layer, the rear layer of glass is installed with an outer shutter in an air supply cavity by a rotating shaft for an outer shutter in an air supply cavity, and the front layer of glass is installed with an inner shutter in the air supply cavity by a rotating shaft for an inner shutter in the air supply cavity; for the front and the rear layers of glass at a side opposite to the air outlet in the upper layer, the rear layer of glass is installed with an outer shutter in an air exhaust cavity by a rotating shaft for an outer shutter in an air exhaust cavity, and the front layer of glass is installed with an inner shutter in the air exhaust cavity by a rotating shaft for an inner shutter in the air exhaust cavity; the connection by the rotating shaft for the shutter is provided such that a respective shutter is open to connect to the indoor or outdoor space.

2. The fresh air purification window for anti-haze of claim 1, wherein each of above shutters is installed at corresponding end of glass and each of above rotating shafts is installed at corresponding window frame, such that the corresponding glass and window frame are connected via corresponding shutter.

3. The fresh air purification window for anti-haze of claim 1, wherein a hinge shaft of each shutter for air exhaust and air supply is connected to a stepping motor; a PM2.5 sensor for monitoring a concentration of a pollutant and a solar panel for supplying the electric energy are disposed outside the fresh air purification window for anti-haze; the stepping motor and the PM2.5 sensor are connected to a control system.

4. The fresh air purification window for anti-haze of claim 1, wherein the spray nozzle is a high pressure spray nozzle that is connected to an indoor water supply pipe.

5. The fresh air purification window for anti-haze of claim 1, further comprising a cloud server, an APP, and a WIFI module; a PM2.5 sensor transmits collected data to the APP through the cloud server, and signals in a corresponding mode selected by the user according to the data are transmitted to the cloud server through the APP, and the cloud server transmits control signals for starting motors to the motors through the WiFi module, the control signals is used for controlling the controlled starting or closing of the motors of four shutters and two fans.

* * * * *